Dec. 20, 1949     H. F. GEORGE     2,491,609
AIRPLANE CONTROL WHEEL
Filed Feb. 6, 1947
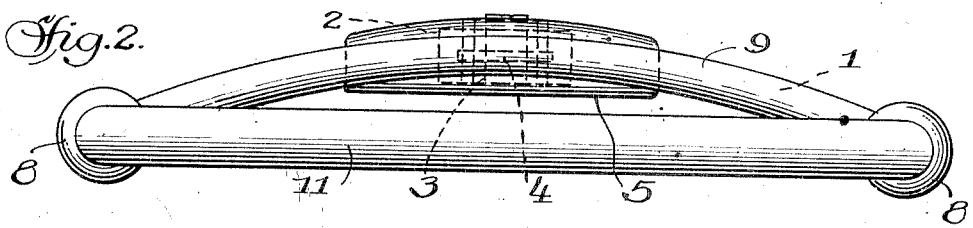
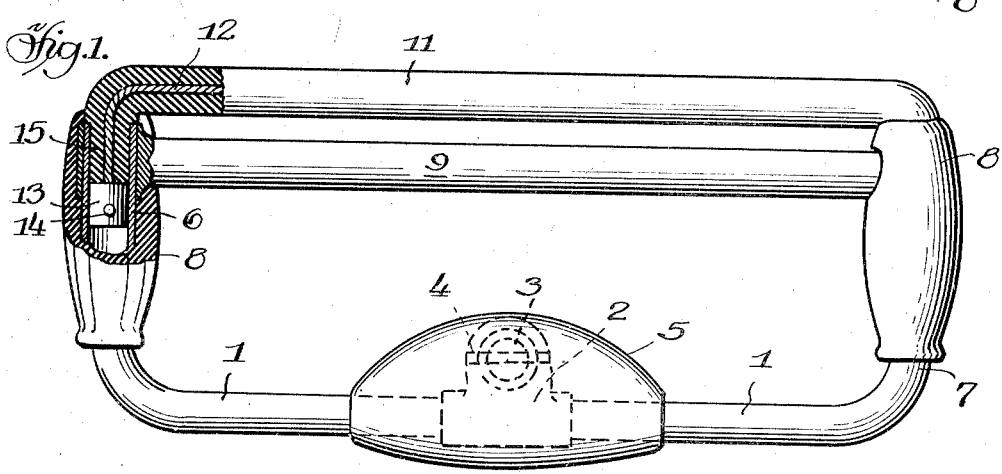
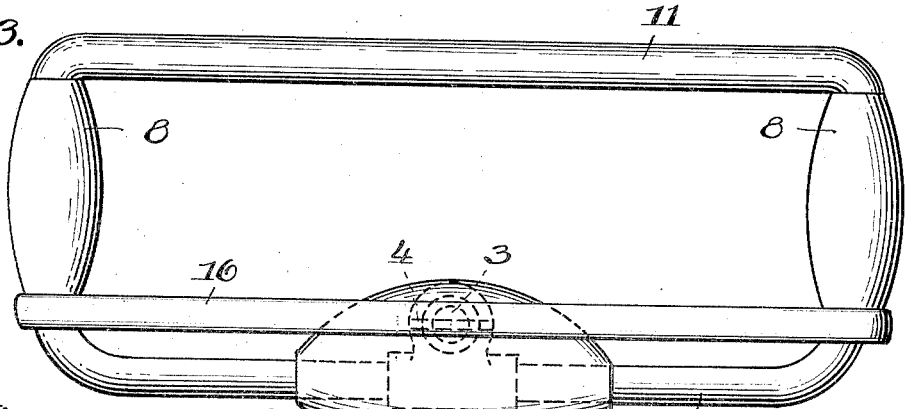
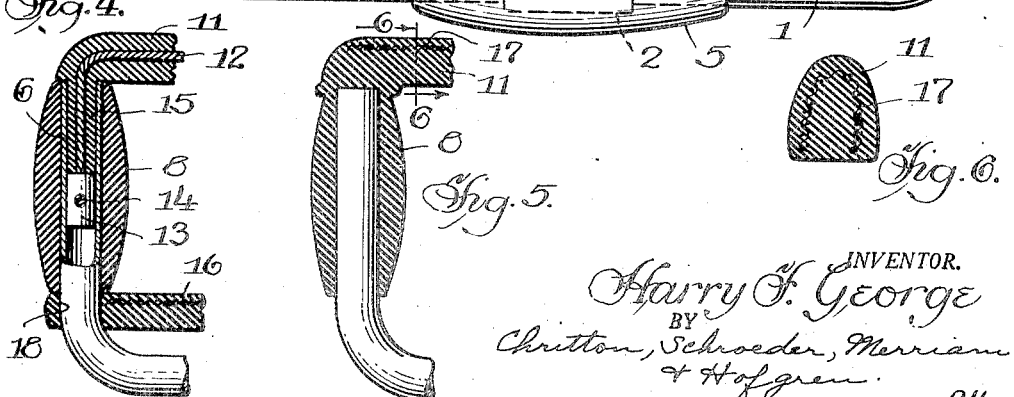
INVENTOR.
Harry F. George
BY Chritton, Schroeder, Merriam & Hofgren
Attys.

Patented Dec. 20, 1949

2,491,609

UNITED STATES PATENT OFFICE 2,491,609

AIRPLANE CONTROL WHEEL

Harry F. George, Chicago, Ill.

Application February 6, 1947, Serial No. 726,837

12 Claims. (Cl. 74—552)

This invention relates to airplane control wheels, and more particularly to such control wheels so constructed as to provide maximum safety to the operator or operators of an airplane and the like at the time of a crash or other accident.

Control wheels for airplanes and the like, as heretofore constructed, have been objectionable from the standpoint of safety, in that they have had unprotected projecting parts against which the head or body of the pilot or other operator could contact with resulting serious damage, during the time of a crash or other accident that would throw the pilot or operator out of his normal position in the seat. Often at such times the pilot or operator is thrown with his head forcibly contacting the control wheel, or other portions of his body being violently forced thereagainst. When the head or other parts of his body strikes the control wheel, any projecting or rigid parts of such wheels, as heretofore known, constitute a grave potential danger of piercing the head or body or causing other serious damage to the pilot or operator during a crash landing or other serious shake-up of the air craft.

In the present invention I have overcome these dangerous possibilities by providing a control wheel of maximum safety in these regards. Many crash landings, or the striking on the ground of rigid, fixed objects such as trees, poles, posts, walls and the like, are of such nature as ordinarily not to kill the pilot or operator, but if he is not adequately protected he might receive very serious injury from the control wheel. Even in a crash from a substantial height, the pilot or operator might survive if not too badly injured from the control wheel. The present invention aims to reduce to the minimum the possibility of such injury.

Among the objects of this invention are: to provide a novel and improved control wheel for aircraft and the like; to provide a control wheel of the type referred to having protecting means to prevent serious injury to the head or body of the pilot or operator; to provide a control wheel having a flexible protecting member covering the ends of the wheel handle bars and extending therebetween; to provide means for preventing the handle bars from being bent out of shape; to provide handle bars having resilient grips and one or more resilient members extending therebetween; to cover the other parts of the control wheel with protecting means; and such further objects, advantages, and capabilities, inherently possessed by my invention, as will later more fully appear.

My invention further resides in the combination, construction and arrangement of parts, illustrated in the accompanying drawings and while I have shown therein for illustrative purposes preferred embodiments, I wish it understood that the same are susceptible of modification and change without departing from the spirit of my invention.

In the drawings:

Fig. 1 is a rear elevation, partly in section, of a control wheel embodying my invention.

Fig. 2 is a top plan view of Fig. 1.

Fig. 3 is a rear elevation of a modified form of my invention.

Fig. 4 is a fragmentary vertical longitudinal section taken on the median plane through the handle bar end, grip member and associated parts at the left hand end of Fig. 3, a portion of the handle bar being shown in elevation.

Fig. 5 is a fragmentary vertical longitudinal section through the left hand grip member and associated parts of a modified form of my invention, a portion of the handle bar being shown in elevation.

Fig. 6 is an enlarged vertical transverse section on the line 6—6 of Fig. 5.

In the form of my invention shown in Figs. 1 and 2 my improved control wheel comprises a bottom laterally extending handle bar 1 having fixed thereon centrally of its length a hub member 2 having a laterally extending opening to receive a stub shaft 3 passing through the instrument board, or other adjacent support, and operatively connected therebehind to conventional controlling means in an airplane or other air craft (not shown) such as the rudder, elevators, ailerons, and the like. Stub shaft 3 is fixed in hub 2 by a pin 4 or other suitable fastening means whereby to fix the control wheel to said stub shaft so that they rotate together as a unit. Covering the hub 2 on both the top, bottom and front and extending a distance therefrom along handle bar 1 is a rubber cushion 5 sufficiently thick and soft to prevent injury to the operator's head or other portions of his body should the same be more or less violently thrown thereagainst in cast of an accident.

As seen in Fig. 2, the bottom portion 1 of the handle bar is curved forwardly so that the hub 2 is nearer to the instrument board or other supporting element than the upstanding vertical portions of the handle bar. At its outer ends the main member 1 of the handle bar is curved upwardly to provide a pair (one on each end) of upstanding handle members 6 and 7. Mounted upon each of handle members 6 and 7 is a grip member 8 preferably formed of rubber or other more or less soft material which serves as an efficient gripping means for the hands of the operator as well as a cushion to prevent injury to the operator in case of accident.

In order to stiffen the upstanding handle members 6 and 7 there is provided a metal cross bar 9, which may be tubular or not as desired, and is fixed at its ends to said upstanding handle members, as for example by having at each end an integral sleeve slipped over and fixed to the upper ends of the members 6 and 7 (Fig. 1). Cross bar 9 thus serves to prevent the upstanding handle members from being bent toward or away from each other in case of accident.

Fixed at its respective ends to the upstanding handle members 6 and 7 is a flexible cross member 11 which may be a rubber bar, or other suitable flexible member of sufficient flexibility and strength to safely receive the impact of the pilot's head or other portion of his body should the same be thrown thereagainst in case of accident. As shown in Fig. 1, this flexible cross member or protector 11 is preferably of rubber and has extended longitudinally therethrough a cable 12 which at each end is fixed firmly within a sleeve or plug 13 positioned inside of the tube 6 (and 7) and fixed thereto by a pin 14. The depending ends 15 of member 11 may contact the sleeves 13 or not as desired.

It is thus seen that by providing the flexible protector member 11 to extend between the top ends of the upstanding handle portions, the rubber or other soft grip members 8 and the soft protecting cushion 5 over the hub, I have produced a control wheel in which the pilot or operator will have a very large degree of safety in case of accident to the air craft, such as in crashing, landing too abruptly, or striking fixed objects, or the like. As will be understood, the flexible protecting member 11 is sufficiently taut to normally maintain its position but yet yieldable to withstand considerable pressure from the pilot's head or body and yet prevent him from serious injury. The handle grips 8 and soft cushion member 5 also aid very materially in this connection. The cross protecting member 11 will be positioned a sufficient distance above the reinforcing cross bar 9, and laterally to one side of the greater portion thereof, so as to prevent contact of the pilot's head or body against said cross bar 9.

In Figs. 3 and 4 the cross bar 9 is omitted but the ends of the protecting member 11 are fixed in the upright members 6 and 7 in a manner similar to that described above in connection with Fig. 1. In the form shown in Fig. 5 the protecting cross member 11 may at its ends be formed integrally with the handle grip members 8 so that its ends may be applied downwardly over the top ends of the upstanding handle members and cemented or otherwise secured thereto.

In the form of my invention shown in Figs. 3 and 4 I have, in addition to the protecting cross member 11, also provided at the bottom of the grip members 8 another cross member 16 similar in nature to the resilient flexible protecting cross member 11. The ends of member 16 have openings 18 therein to be positioned over handle members 6 and 7 before the grip members are applied thereto. This lower protecting member 16 gives further protection to the pilot's head or body should the same strike the control wheel at a position lower than that occupied by the top protecting flexible cross bar 11. This gives added protection to the pilot or operator in case of accident. The cross sectional shape of the flexible protecting member 16 may be the same as shown in Fig. 6 or otherwise as desired, the essential feature being that it be sufficiently sturdy and yet flexible and resilient so as to safely receive contact from the pilot's head or body without injury to the pilot. As will be understood, the pilot will sit on the near side of Figs. 1 and 3 and in a position below the view shown in Fig. 2. The pilot or operator will be in a position to readily grip the handle grips 8 for easy and efficient operation of the control mechanism of the air craft and at the same time be effectively protected against injury by contact against the control wheel in case of accident. As explained, I prefer rubber as a material for the cross protecting members 11 and 16, but if desired the same may be formed of flexible cord of acceptable size and softness, or other suitable flexible material. The stub shaft 3 may be solid or tubular as desired. The rigid reinforcing cross bar 9 will preferably be bowed rearwardly to follow the contour of the bottom bar member 1, as seen in Fig. 2. The cross members 11 and 16 may be suitably reinforced as for example by the cable 12 shown in Figs. 1 and 4, or by having embedded therein a strip of canvas 17, as shown in Figs. 5 and 6, or other suitable reinforcing means, depending upon the type of cross member used.

I claim:

1. A control wheel for aircraft and the like, comprising, a pair of handle bars having a hub and a pair of upstanding handles having resilient grips on their upper end portions, and a flexible protecting member extending between said upper end portions and fixed thereto, said protecting member having its main portion beyond the ends of the upstanding handles.

2. A control wheel as claimed in claim 1, in which said flexible protecting member is formed of reinforced rubber, the reinforcement of which is secured at its ends to said handles.

3. A control wheel as claimed in claim 1, having a second flexible protecting member extending between said handles below said grips.

4. A control wheel for aircraft and the like, comprising, rigid bottom bar having a hub adapted to be connected to controlling mechanism in the aircraft and a pair of upstanding tubular handles, a resilient grip on each of said handles, a sturdy flexible protecting member extending between the free ends of said handles and fixed thereto, and a rigid cross brace connecting said handles below said flexible member, the ends of said protecting member extending into the open ends of said tubular handles.

5. A control wheel as claimed in claim 4, having a rubber cushion protecting cap covering said hub.

6. A control wheel for airplanes and the like, comprising, a rigid rearwardly bent bottom bar having a hub in its central portion, an upwardly extending handle at each of the outer ends of the bottom bar, a resilient grip on each of said handles, and a rubber member connecting the free ends of said handles and fixed thereto to protect the operator in case of accident, said rubber member at each end being bent to extend in a direction parallel with its respective handle member.

7. A control wheel as claimed in claim 6, including rigid bracing means extending between said handles above said bottom bar and below said rubber member.

8. A control member adapted to be mounted for steering and handling of an aircraft, comprising a rigid bottom bar having a pair of upwardly extending handles, grip members on said handles, a flexible, resilient cushioning member connected to the free ends of said handles and extending therebetween to protect the pilot in case of accident, and a rigid member fixed to and connecting said handles to prevent them from being bent out of normal position, said rigid member being spaced vertically from said cushioning member.

9. A control member adapted to be mounted for steering and handling of an aircraft, comprising a rigid bottom bar having a pair of upwardly extending tubular handles, grip members on said handles, a flexible, resilient first cushioning member connected to the free ends of said handles and extending therebetween to protect the pilot in case of accident, the connection of said first cushioning member with the handles being inside of the tubular handles, and a second cushioning member connected to and extending between the handles below said grip members.

10. A control member adapted to be mounted for steering and handling of an aircraft, comprising a rigid bottom bar having a pair of upwardly extending handles, grip members on said handles, a flexible, resilient cushioning member connected to said handles and extending therebetween to protect the pilot in case of accident, said cushioning member being of substantial thickness and formed of reinforced rubber, the reinforcement of which is fixed to said handles.

11. A control member adapted to be mounted for steering and handling an aircraft, comprising a rigid bottom bar having a hub, a pair of upwardly extending handles one on each end of the bottom bar, a rubber grip member on each of said handles, a reinforced rubber member connecting said handles above the grip members, a reinforced rubber member connecting said handles below said grip members, and a rubber cushion covering said hub, the reinforcement of the first mentioned rubber member being a cable fixed at its ends to the handles, whereby in case of an accident the pilot's body and head will be protected from injury by said two rubber members and said hub cushion in case of accident.

12. A control member adapted to be mounted for controlling an aircraft, comprising a rigid bottom bar having a hub, a pair of upwardly extending tubular handles one on each end of the bottom bar, a rubber grip member on each of said handles, a rubber protecting member connecting said handles, a cable extending longitudinally through said protecting member, a pair of plugs secured firmly one on each end of said cable, each of said plugs being fixed within one of said tubular handles.

HARRY F. GEORGE.

REFERENCES CITED

The following references are of record in the file of this patent:

UNITED STATES PATENTS

| Number | Name | Date |
|---|---|---|
| 1,647,903 | Cook | Nov. 1, 1927 |
| 1,738,855 | Thompson | Dec. 10, 1929 |
| 2,204,070 | Crockett | June 11, 1940 |
| D. 135,167 | Obzarny et al. | Mar. 2, 1943 |
| D. 138,079 | Drew | June 13, 1944 |
| D. 147,702 | Vevrit | Oct. 14, 1947 |

FOREIGN PATENTS

| Number | Country | Date |
|---|---|---|
| 10,844 | Great Britain | May 31, 1895 |
| 92,678 | Germany | July 5, 1897 |
| 751,438 | France | Sept. 4, 1933 |